(12) United States Patent
Klassen et al.

(10) Patent No.: US 11,043,885 B2
(45) Date of Patent: Jun. 22, 2021

(54) ROTARY ACTUATOR

(71) Applicant: GENESIS ROBOTICS AND MOTION TECHNOLOGIES CANADA, ULC, Langley (CA)

(72) Inventors: James Brent Klassen, Surrey (CA); Bradley Christopher Pope, Langley (CA)

(73) Assignee: GENESIS ROBOTICS AND MOTION TECHNOLOGIES CANADA, ULC, Langley (CA)

( * ) Notice: Subject to any disclaimer, the term of this patent is extended or adjusted under 35 U.S.C. 154(b) by 131 days.

(21) Appl. No.: 16/317,756

(22) PCT Filed: Jul. 14, 2017

(86) PCT No.: PCT/CA2017/050858
§ 371 (c)(1),
(2) Date: Jan. 14, 2019

(87) PCT Pub. No.: WO2018/010032
PCT Pub. Date: Jan. 18, 2018

(65) Prior Publication Data
US 2019/0288587 A1 Sep. 19, 2019

Related U.S. Application Data

(63) Continuation-in-part of application No. 15/235,088, filed on Aug. 11, 2016, now Pat. No. 10,476,323.
(Continued)

(51) Int. Cl.
*H02K 16/02* (2006.01)
*H02K 1/14* (2006.01)
(Continued)

(52) U.S. Cl.
CPC ............. *H02K 16/02* (2013.01); *H02K 1/146* (2013.01); *H02K 1/20* (2013.01); *H02K 3/42* (2013.01); *H02K 3/522* (2013.01); *H02K 7/088* (2013.01)

(58) Field of Classification Search
CPC .......... H02K 16/02; H02K 1/146; H02K 1/20; H02K 3/42; H02K 3/522; H02K 7/088; H02K 21/24; H02K 2201/03
(Continued)

(56) References Cited

U.S. PATENT DOCUMENTS

| 2,665,243 A | 1/1954 | Young et al. |
| 3,383,534 A | 5/1968 | Ebbs |

(Continued)

FOREIGN PATENT DOCUMENTS

| CA | 2187096 C | 6/2004 |
| CN | 1685585 A | 10/2005 |

(Continued)

OTHER PUBLICATIONS

Extended European Search Report in EU application No. 17826734.0, dated Feb. 19, 2020, pp. 6.
(Continued)

*Primary Examiner* — Alex W Mok

(57) ABSTRACT

An actuator for high rotational speed applications using a stator which utilizes laminated features to reduce Eddy current losses in the stator. This construction allows high pole counts while providing the efficiency and high speed benefits of a laminated construction. Laminated construction is very challenging for a high pole count lightweight motor, but embodiments of the device provide structural strength, and rigidity, as well as other benefits such as low manufacturing cost, high heat dissipation, integrated cooling channels, and light weight construction. Many of these benefits
(Continued)

result from the use of a laminate sandwich of non-magnetic, heat conductive material, such as anodized aluminum, as a structural member of the stator.

17 Claims, 9 Drawing Sheets

Related U.S. Application Data

(60) Provisional application No. 62/363,202, filed on Jul. 15, 2016.

(51) Int. Cl.
| | |
|---|---|
| *H02K 1/20* | (2006.01) |
| *H02K 3/42* | (2006.01) |
| *H02K 3/52* | (2006.01) |
| *H02K 7/08* | (2006.01) |

(58) Field of Classification Search
USPC .......................................................... 310/65
See application file for complete search history.

(56) References Cited

U.S. PATENT DOCUMENTS

| | | |
|---|---|---|
| 4,245,870 A | 1/1981 | Punshon et al. |
| 4,307,309 A | 12/1981 | Barrett |
| 4,310,390 A | 1/1982 | Bradley et al. |
| 4,319,152 A | 3/1982 | Van |
| 4,394,594 A | 7/1983 | Schmider et al. |
| 4,398,112 A | 8/1983 | Van |
| 4,501,980 A | 2/1985 | Welburn |
| 4,568,862 A | 2/1986 | Tassinario |
| 4,658,165 A | 4/1987 | Vanderschaeghe |
| 4,716,327 A | 12/1987 | Stone |
| 4,900,965 A | 2/1990 | Fisher |
| 4,959,577 A | 9/1990 | Radomski |
| 5,004,944 A | 4/1991 | Fisher |
| 5,010,267 A | 4/1991 | Lipo et al. |
| 5,010,268 A | 4/1991 | Dijken |
| 5,091,609 A | 2/1992 | Sawada et al. |
| 5,128,575 A | 7/1992 | Heidelberg et al. |
| 5,144,183 A | 9/1992 | Farrenkopf |
| 5,177,392 A * | 1/1993 | Scott .................. H02K 1/02 310/268 |
| 5,212,419 A | 5/1993 | Fisher et al. |
| 5,252,880 A | 10/1993 | Kazmierczak et al. |
| 5,334,898 A * | 8/1994 | Skybyk ................. H02K 3/46 310/114 |
| 5,334,899 A | 8/1994 | Skybyk |
| 5,396,140 A | 3/1995 | Goldie et al. |
| 5,445,456 A | 8/1995 | Isoda et al. |
| 5,604,390 A | 2/1997 | Ackermann |
| 5,616,977 A | 4/1997 | Hill |
| 5,625,241 A | 4/1997 | Ewing et al. |
| 5,642,009 A | 6/1997 | McCleer et al. |
| 5,642,013 A | 6/1997 | Wavre |
| 5,646,467 A | 7/1997 | Floresta et al. |
| 5,744,888 A | 4/1998 | Zajc et al. |
| 5,834,864 A | 11/1998 | Hesterman et al. |
| 5,834,875 A | 11/1998 | Hill |
| 5,874,796 A * | 2/1999 | Petersen ............. H02K 1/146 310/156.37 |
| 5,942,830 A | 8/1999 | Hill |
| 5,955,808 A | 9/1999 | Hill |
| 5,982,074 A | 11/1999 | Smith et al. |
| 6,006,792 A | 12/1999 | Krumm et al. |
| 6,081,059 A | 6/2000 | Hsu |
| 6,147,428 A | 11/2000 | Takezawa et al. |
| 6,239,516 B1 | 5/2001 | Floresta et al. |
| 6,242,831 B1 | 6/2001 | Khan |
| 6,261,437 B1 | 7/2001 | Hernnaes et al. |
| 6,313,556 B1 | 11/2001 | Dombrovski et al. |
| 6,348,751 B1 | 2/2002 | Jermakian et al. |
| 6,376,961 B2 | 4/2002 | Murakami et al. |
| 6,417,587 B1 | 7/2002 | Komatsu et al. |
| 6,590,312 B1 | 7/2003 | Seguchi et al. |
| 6,601,287 B2 | 8/2003 | Pop, Sr. |
| 6,664,704 B2 | 12/2003 | Calley |
| 6,700,297 B2 | 3/2004 | Hsu et al. |
| 6,768,238 B2 | 7/2004 | Knauff et al. |
| 6,833,647 B2 | 12/2004 | Saint-Michel et al. |
| 6,856,063 B1 * | 2/2005 | Kelecy ..................... H02K 3/04 29/596 |
| 6,933,643 B1 | 8/2005 | Heine et al. |
| 6,936,948 B2 | 8/2005 | Bell et al. |
| 6,975,057 B2 | 12/2005 | Gauthier et al. |
| 6,987,342 B2 | 1/2006 | Hans |
| 6,995,494 B2 | 2/2006 | Haugan et al. |
| 7,109,625 B1 | 9/2006 | Jore et al. |
| 7,141,905 B2 | 11/2006 | Vollmer |
| 7,157,827 B2 | 1/2007 | Heideman et al. |
| 7,190,101 B2 | 3/2007 | Hirzel |
| 7,215,056 B2 | 5/2007 | Dressel |
| 7,385,329 B2 | 6/2008 | Hill |
| 7,425,772 B2 | 9/2008 | Vidal |
| 7,548,003 B2 | 6/2009 | Nickel-Jetter et al. |
| 7,554,226 B2 | 6/2009 | Kojima et al. |
| 7,586,217 B1 | 9/2009 | Smith et al. |
| 7,597,025 B2 | 10/2009 | Narita et al. |
| 7,646,124 B2 | 1/2010 | Himmelmann et al. |
| 7,663,283 B2 | 2/2010 | Holtzapple et al. |
| 7,675,213 B2 | 3/2010 | Tenhunen |
| 7,679,260 B2 | 3/2010 | Yamamoto et al. |
| 7,687,962 B2 | 3/2010 | Imai et al. |
| 7,692,357 B2 | 4/2010 | Qu et al. |
| 7,741,750 B1 | 6/2010 | Tang |
| 7,800,471 B2 | 9/2010 | Fullerton et al. |
| 7,816,822 B2 | 10/2010 | Nashiki |
| 7,836,788 B2 | 11/2010 | Kamon et al. |
| 7,851,965 B2 | 12/2010 | Calley et al. |
| 7,868,508 B2 | 1/2011 | Calley et al. |
| 7,868,721 B2 | 1/2011 | Fullerton et al. |
| 7,898,123 B2 | 3/2011 | Usui |
| 7,911,107 B2 | 3/2011 | Nashiki |
| 7,915,776 B2 | 3/2011 | Takahata et al. |
| 7,923,881 B2 | 4/2011 | Ionel et al. |
| 7,923,886 B2 | 4/2011 | Calley et al. |
| 7,948,340 B2 | 5/2011 | Rastogi et al. |
| 7,965,011 B2 | 6/2011 | Liao |
| 7,990,011 B2 | 8/2011 | Yoshino et al. |
| 8,004,127 B2 | 8/2011 | Potter |
| 8,053,944 B2 | 11/2011 | Calley et al. |
| 8,084,879 B2 | 12/2011 | Stiesdal |
| 8,179,126 B2 | 5/2012 | Li et al. |
| 8,179,219 B2 | 5/2012 | Fullerton et al. |
| 8,222,786 B2 | 7/2012 | Calley et al. |
| 8,242,658 B2 | 8/2012 | Calley et al. |
| 8,264,113 B2 | 9/2012 | Takemoto et al. |
| 8,330,317 B2 | 12/2012 | Burch et al. |
| 8,395,291 B2 | 3/2013 | Calley et al. |
| 8,395,292 B2 | 3/2013 | Amari et al. |
| 8,405,275 B2 | 3/2013 | Calley et al. |
| 8,415,848 B2 | 4/2013 | Calley et al. |
| 8,450,899 B2 | 5/2013 | Umeda et al. |
| 8,487,497 B2 | 7/2013 | Taniguchi |
| 8,497,615 B2 | 7/2013 | Kimura et al. |
| 8,558,426 B2 | 10/2013 | Stiesdal |
| 8,704,626 B2 | 4/2014 | Fullerton et al. |
| 8,736,133 B1 | 5/2014 | Smith et al. |
| 8,749,108 B2 | 6/2014 | Dyer et al. |
| 8,760,023 B2 | 6/2014 | Calley et al. |
| 8,836,196 B2 | 9/2014 | Calley et al. |
| 8,847,454 B2 | 9/2014 | Saito et al. |
| 8,847,522 B2 | 9/2014 | Nashiki et al. |
| 8,854,171 B2 | 10/2014 | Janecek |
| 8,916,999 B2 | 12/2014 | Imai et al. |
| 8,946,960 B2 | 2/2015 | Camilleri et al. |
| 8,952,590 B2 | 2/2015 | Calley et al. |
| 8,987,968 B2 | 3/2015 | Morishita et al. |
| 9,006,941 B2 | 4/2015 | Zhao |
| 9,006,951 B2 | 4/2015 | Janecek et al. |
| 9,054,566 B2 | 6/2015 | Woolmer |

(56) References Cited

U.S. PATENT DOCUMENTS

| | | |
|---|---|---|
| 9,059,621 B2 | 6/2015 | Aoyama |
| 9,071,117 B2 | 6/2015 | Woolmer |
| 9,111,673 B2 | 8/2015 | Fullerton et al. |
| 9,126,332 B2 | 9/2015 | L'Ecuyer et al. |
| 9,154,024 B2 | 10/2015 | Jore et al. |
| 9,178,399 B2 | 11/2015 | Parviainen |
| 9,281,735 B2 | 3/2016 | Gandhi et al. |
| 9,287,755 B2 | 3/2016 | Woolmer et al. |
| 9,475,199 B2 | 10/2016 | Burridge et al. |
| 9,537,362 B2 | 1/2017 | Jansen et al. |
| 2003/0111926 A1 | 6/2003 | Decristofaro et al. |
| 2004/0021386 A1 | 2/2004 | Swett |
| 2005/0140227 A1 | 6/2005 | Kuwert |
| 2005/0179336 A1 | 8/2005 | Hasebe et al. |
| 2005/0212381 A1* | 9/2005 | Gilmour ............... H02K 1/182 310/266 |
| 2006/0238053 A1 | 10/2006 | Kascak et al. |
| 2006/0284507 A1 | 12/2006 | Murakami |
| 2007/0069591 A1* | 3/2007 | LeFlem ............... H02K 41/031 310/12.12 |
| 2007/0222306 A1 | 9/2007 | Hultman et al. |
| 2007/0236090 A1 | 10/2007 | Hoppe et al. |
| 2007/0278865 A1 | 12/2007 | Matscheko |
| 2008/0001488 A1 | 1/2008 | Pyrhonen et al. |
| 2008/0214347 A1 | 9/2008 | Scharfenberg et al. |
| 2008/0224558 A1 | 9/2008 | Ionel |
| 2008/0238266 A1 | 10/2008 | Moriyama et al. |
| 2009/0001835 A1 | 1/2009 | Kojima et al. |
| 2009/0195106 A1 | 8/2009 | Iki |
| 2010/0019586 A1 | 1/2010 | Lu |
| 2010/0109466 A1 | 5/2010 | Kondo et al. |
| 2010/0164313 A1 | 7/2010 | Langford et al. |
| 2010/0183460 A1 | 7/2010 | Qin et al. |
| 2011/0025146 A1 | 2/2011 | Goodzeit et al. |
| 2011/0033321 A1 | 2/2011 | Mikkelsen et al. |
| 2011/0037329 A1 | 2/2011 | Nord et al. |
| 2011/0109099 A1 | 5/2011 | Stiesdal |
| 2011/0234033 A1* | 9/2011 | Filatov ............... H02K 7/09 310/90.5 |
| 2011/0260566 A1 | 10/2011 | Odvarka et al. |
| 2011/0285141 A1 | 11/2011 | Groendahl et al. |
| 2011/0309699 A1 | 12/2011 | Woolmer et al. |
| 2012/0001018 A1 | 1/2012 | Gilleran et al. |
| 2012/0001511 A1 | 1/2012 | Matt et al. |
| 2012/0047523 A1 | 2/2012 | Smirnov et al. |
| 2012/0086296 A1* | 4/2012 | Cleveland ............... H02K 3/26 310/179 |
| 2012/0104895 A1 | 5/2012 | Ramu |
| 2012/0212085 A1 | 8/2012 | Fu et al. |
| 2012/0267967 A1 | 10/2012 | Trago et al. |
| 2012/0279338 A1 | 11/2012 | Ihrke et al. |
| 2012/0299430 A1 | 11/2012 | Pennander et al. |
| 2013/0113320 A1 | 5/2013 | Calley et al. |
| 2013/0140920 A1 | 6/2013 | Wei et al. |
| 2013/0147291 A1 | 6/2013 | Woolmer et al. |
| 2013/0187492 A1 | 7/2013 | Woolmer |
| 2013/0249330 A1 | 9/2013 | King et al. |
| 2013/0249342 A1 | 9/2013 | Funk |
| 2013/0342048 A1 | 12/2013 | Hogmark |
| 2014/0035417 A1 | 2/2014 | Nadeau et al. |
| 2014/0035423 A1 | 2/2014 | Veronesi et al. |
| 2014/0049124 A1 | 2/2014 | Gandhi et al. |
| 2014/0054062 A1 | 2/2014 | Yoshida et al. |
| 2014/0132102 A1 | 5/2014 | Peng et al. |
| 2014/0197701 A1 | 7/2014 | Hossain et al. |
| 2014/0217944 A1 | 8/2014 | Yang |
| 2014/0299668 A1 | 10/2014 | Fullerton et al. |
| 2014/0319949 A1* | 10/2014 | Langreck ............... H02K 1/2706 310/112 |
| 2014/0333171 A1 | 11/2014 | Lange et al. |
| 2014/0346910 A1 | 11/2014 | Nakano et al. |
| 2015/0048712 A1 | 2/2015 | Janecek et al. |
| 2015/0091403 A1 | 4/2015 | Ueda |
| 2015/0171682 A1 | 6/2015 | Fujisawa et al. |
| 2015/0229194 A1 | 8/2015 | Sromin |
| 2015/0244219 A1 | 8/2015 | Woolmer |
| 2015/0270760 A1 | 9/2015 | Kreidler et al. |
| 2015/0308438 A1 | 10/2015 | Janecek |
| 2015/0318745 A1 | 11/2015 | Matsuoka |
| 2015/0349591 A1 | 12/2015 | Deguchi et al. |
| 2015/0364956 A1 | 12/2015 | Woolmer et al. |
| 2016/0164394 A1 | 6/2016 | Knaian et al. |
| 2016/0315510 A1 | 10/2016 | Kawamata et al. |
| 2017/0201164 A1 | 7/2017 | Copeland, Jr. |

FOREIGN PATENT DOCUMENTS

| | | |
|---|---|---|
| CN | 102624108 A | 8/2012 |
| CN | 203827088 U | 10/2014 |
| CN | 105196889 A | 12/2015 |
| DE | 3320805 A1 | 12/1984 |
| DE | 4216489 C2 | 10/1996 |
| DE | 19851439 A1 | 3/2000 |
| DE | 19954196 A1 | 6/2000 |
| DE | 69524380 T2 | 8/2002 |
| DE | 10140362 A1 | 3/2003 |
| EP | 1734645 A2 | 12/2006 |
| EP | 2381559 A2 | 10/2011 |
| EP | 2773023 A1 | 3/2014 |
| EP | 2156536 B1 | 7/2014 |
| EP | 2765633 A1 | 8/2014 |
| EP | 2873551 A2 | 5/2015 |
| EP | 2873601 A1 | 5/2015 |
| EP | 2874227 A1 | 5/2015 |
| EP | 2874277 A2 | 5/2015 |
| EP | 2999102 A2 | 3/2016 |
| EP | 2869433 B1 | 9/2016 |
| FR | 2519483 A1 | 7/1983 |
| JP | H06026491 A | 2/1994 |
| JP | H06-335191 A | 12/1994 |
| JP | H10192413 A | 7/1998 |
| JP | 2005-045868 A | 2/2005 |
| JP | 2006-166634 A | 6/2006 |
| JP | 2008-048498 A | 2/2008 |
| JP | 2008-113531 A | 5/2008 |
| JP | 2008228363 A | 9/2008 |
| JP | 2009183072 A | 8/2009 |
| JP | 2010246171 A | 10/2010 |
| JP | 5292541 B2 | 9/2013 |
| JP | 2013197275 A | 9/2013 |
| JP | 2014036519 A | 2/2014 |
| JP | 2016005350 A | 1/2016 |
| JP | 2016086533 A | 5/2016 |
| LV | 14007 B | 11/2009 |
| WO | 88/06375 A1 | 8/1988 |
| WO | 92/10024 A1 | 6/1992 |
| WO | 0226271 A1 | 4/2002 |
| WO | 03095242 A8 | 12/2004 |
| WO | 2007/026047 A1 | 3/2007 |
| WO | 2008/135628 A1 | 11/2008 |
| WO | 03/073591 A1 | 9/2009 |
| WO | 2012/101327 A1 | 8/2012 |
| WO | 2012/142230 A2 | 10/2012 |
| WO | 2012/156719 A2 | 11/2012 |
| WO | 2013/002658 A2 | 1/2013 |
| WO | 2014/090516 A1 | 6/2014 |
| WO | 2014/100255 A1 | 6/2014 |
| WO | 2014/205523 A2 | 12/2014 |
| WO | 2015/019107 A2 | 2/2015 |
| WO | 2015/032704 A1 | 3/2015 |
| WO | 2015/032705 A1 | 3/2015 |
| WO | 2015/032707 A1 | 3/2015 |
| WO | 2015/032708 A2 | 3/2015 |
| WO | 2015/032709 A1 | 3/2015 |
| WO | 2015/036779 A2 | 3/2015 |
| WO | 2015/036780 A2 | 3/2015 |
| WO | 2015/055265 A2 | 4/2015 |
| WO | 2015/070938 A1 | 5/2015 |
| WO | 2015/070978 A1 | 5/2015 |
| WO | 2015/070984 A1 | 5/2015 |
| WO | 2015/071012 A1 | 5/2015 |
| WO | 2015/071088 A1 | 5/2015 |
| WO | 2015/071096 A1 | 5/2015 |

(56) References Cited

FOREIGN PATENT DOCUMENTS

| | | |
|---|---|---|
| WO | 2015/071121 A1 | 5/2015 |
| WO | 2015/071127 A1 | 5/2015 |
| WO | 2015/071144 A1 | 5/2015 |
| WO | 2015/071186 A1 | 5/2015 |
| WO | 2015/071340 A1 | 5/2015 |
| WO | 2015/071400 A1 | 5/2015 |
| WO | 2015/071468 A2 | 5/2015 |
| WO | 2015/071469 A2 | 5/2015 |
| WO | 2015/071470 A1 | 5/2015 |
| WO | 2015/071576 A1 | 5/2015 |
| WO | 2015/072173 A1 | 5/2015 |
| WO | 2015/072299 A1 | 5/2015 |
| WO | 2015/089518 A1 | 6/2015 |
| WO | 2015/124922 A1 | 8/2015 |
| WO | WO2016067718 A1 | 5/2016 |
| WO | 2016/203101 A1 | 12/2016 |
| WO | 2018/010031 A1 | 1/2018 |
| WO | 2018/010032 A1 | 1/2018 |

OTHER PUBLICATIONS

Libert et al., Investigation on Pole-Slot Combinations for Permanent-Magnet Machines with Contrated Windings Jan. 2004, 7 pages.
International Search Report and the Written Opinion received for PCT Application No. PCT/CA2017/050470, dated Aug. 15, 2017, 10 pages.
International Search Report and the Written Opinion received for PCT Application No. PCT/CA2017/050471, dated Jul. 27, 2017, 8 pages.
International Search Report and the Written Opinion received for PCT Application No. PCT/CA2017/050856, dated Oct. 19, 2017, 8 pages.
International Search Report and the Written Opinion received for PCT Application No. PCT/CA2017/050857, dated Oct. 24, 2017, 13 pages.
International Search Report and the Written Opinion received for PCT Application No. PCT/CA2017/050957, dated Dec. 11, 2017, 9 pages.
International Search Report and the Written Opinion received for PCT Application No. PCT/CA2017/050858, dated Sep. 18, 2017, 8 pages.
Magnax Specification Sheet, "Magnax Axial Flux Synchronous Motor/Generator", Feb. 22, 2017, pp. 1-4.
Mezzarobba Thesis, "Study of innovative electric machines for high efficiency vehicular Traction applications" 2013, pp. 1-165.
Christopher A. Gallo, "Halbach Magnetic Rotor Development", Feb. 2008, NASAITM, 25 pages.
Xo Wang, "Delicious Axial Flux Flap Jack"; Retrieved from Internet URL:< www.geekshavefeelings.com>, Feb. 24, 2013, 12 pages.
ATE, Axial-Flux-Motors (AF), Retrieved from Internet URL: <https://www.ate-system.de/en/products/af.html>, Accessed on Jan. 20, 2018, pp. 1-2.
Moreels et al., "High Efficiency Axial Flux Machines: Why Axial Flux Motor and Generator Technology Will Drive the Next Generation of Electric Machines", V1.2; Jan. 2018, pp. 1-20.
Bures et al., "Electric Properties of Fe Based Soft Magnetic Composite", Euro PM2011, pp. 1-64.
Baserrah et al., "Transverse flux machines with distributed windings for in-wheel Applications; Institute for Electrical Drives, Power Electronics and Devices", 2009, pp. 102-108.
Woolmer et al., Analysis of the Yokeless and Segmented Armature Machine, 2007, 7 pages.
AXCO Motors, "Axial flux technology," Retrieved from the Internet URL: <www.axcomotors.com/axialfluxtechnology.html> , Feb. 22, 2017, 5 pages.
Bannon et al., "Axial Flux Permanent Magnet Generator", Retrieved from the Internet URL: <https://depts.washington.edu/nnmrec/docs/Generator%20Final%20Report%20ME%20495%20Autumn%202013.pdf>, 2013, 24 pages.
Benlamine et al., "Design of an Axial-Flux Interior Permanent-Magnet Synchronous Motor for Automotive Application: Performance Comparison with Electric Motors used in EVs and HEVs", IEEE Vehicle Power and Propulsion Conftrence (VPPC), 2014, 6 pages.
Boglietti et al., "Evolution and Modem Approaches for Thermal Analysis of Electrical Machines", IEEE Transactions on Industrial Electronics, vol. 56, No. 3, 2009, pp. 871-882.
Capponi et al., "Recent Advances in Axial-Flux Permanent-Magnet Machine Technology", IEEE Transactions on Industry Applications, vol. 48, No. 6, 2012, pp. 2190-2205.
Cavagnino et al., "A Comparison Between the Axial Flux and the Radial Flux Structures for PM Synchronous Motors," IEEEXplore, 2001, pp. 1611-1618.
Cavagnino et al., "A Comparison Between the Axial Flux and the Radial Flux Structures for PM Synchronous Motors," IEEE Transactions on Industry Applications, vol. 38, No. 6, 2011, 1517-1524, 2002.
Celeroton AG, "Ultra-High-Speed Magnetic Bearings", Retrieved from the Internet URL: http://www.celeroton.com/en/technology/magnetic-bearings.html, Jul. 2, 2016, 3 pages.
Chau, "Electric Vehicle Machines and Drives: Design, Analysis and Application", Wiley, Kindle Edition, 2015, 9 pages.
Chau, Electric Vehicle Machines and Drives: Design, Analysis and Application, Wiley-IEEE Press, John Wiley and Sons, Google books publication information, Retrieved from the Internet URL: <https://books.google.ca/books?id=03FXCQAAQBAJ&pg=PA101&lpg#v=onepage&q&f=false>, Sep. 23, 2015, 1 page.
Cheng et al., "Advanced Electrical Machines and Machine-Based Systems for Electric and Hybrid Vehicles", Energies, vol. 8, 2015, pp. 9541-9564.
Choi et al., "Design and Parametric Analysis of Axial Flux PM Motors With Minimized Cogging Torque", IEEE Transactions on Magnetics, vol. 45, No. 6, Jun. 2009, pp. 2855-2858.
Gogue et al., "Theory & Practice of Electromagnetic Design of DC Motors & Actuators", Technical Report, Chapter 7, Motor Design, 1993, 24 pages.
Commonplace Robotics GMBH, "SRA Service Robot Arm Version SRA 1000 HD", 2016, 1 page.
Commonplace Robotics GMBH, "Robot Arm Mover4", User Guide, 2012, 32 pages.
Core Gasless Power, "Technology", Retrieved from the Internet URL:<coreoutdoorpower.com/technology>, 2015, 3 pages.
Laser Technologies, Inc., "Image from Chicago Trade Center", Cornelius, Oct. 6, 2015, 1 page.
Cugat et al., "Magnetic Micro-Actuators and Systems (MAG-MAS)", IEEE Transactions on Magnetics, vol. 39, No. 5, Nov. 2003, pp. 3607-3612.
Custom Coils Inc., "Custom Coil Manufacturing", Retrieved from the Internet URL:< http://www.ccoils.com/Custom-coil-manufacturing.html>, 2014, 3 pages.
Toro, "Basic Electric Machines", Prentice Hall, 1989, pp. 2-3, 9-11, 124-126, 561-563, 141-143, 15 pages.
Desfosse, "What Drives CORE's Quiet Gasless Motors", Retrieved from the Internet URL: <www.popularmechanics.com/home/reviews/a905 2/what -drives-cores-quiet -gasless-motors-15558520>, Jun. 5, 2013, 12 pages.
Gerlando et al., "Axial Flux PM Machines With Concentrated Armature Windings: Design 22 Analysis and Test Validation of Wind Energy Generators", IEEE Transactions on Industrial Electronics, vol. 58, No. 9, Sep. 2011, pp. 3795-3805.
Electric Torque Machines (ETM), "Key Technology Attributes", Retrieved from the Internet URL: <http://etmpower.com/technology>, Jan. 24, 2016, 3 pages.
EMRAX, "EMRAX motors/generators", Roman Susnik Electric Motor Patent Application, Retrieved from the Internet URL: <http://www.enstroj .si/Electric-products/emraxmotorsgenerators.html>, Feb. 18, 2016, 2 pages.
Enstroj, "Manual for EMRAX motors", Owner's manual for the brushless AC synchronous motor EMRAX, V2.0, 2014, 36 pages.
Finken et al., "Study and Comparison of several Permanent-Magnet excited Rotor Types regarding their Applicability in Electric Vehicles", Emobility—Electrical Power Train, 2010, 7 pages.

(56) References Cited

OTHER PUBLICATIONS

Fourie, "Transverse Flux Electric Motor," Retrieved from the Internet URL: <http://www.danielfourie.net/motor.html>, Nov. 7, 2016, 2 pages.

Galea et al., "Development of an aircraft wheel actuator for Green Taxiing", International Conference on Electrical Machines (ICEM), 2014, pp. 2492-2498.

Galea et al., "Torque Density Improvements for High Performance Machines", IEEE International Electric Machines & Drives Conference (IEMDC), 2013, pp. 1066-1073.

Galea, "High Performance, Direct Drive Machines for Aerospace Applications", Department of Electrical and Electronic Engineering, Feb. 2013, 221 pages.

Gholamian et al., "Selecting of Slotted AFPM Motors with High Torque Density for Electric Vehicles", International Journal of Scientific & Engineerin Research, vol. 2, Issue 6, Jun. 2011, pp. 1985-1991.

Gieras, "Axial Flux Permanent Magnet Brushless Machines," Second Edition, Springer, 2008, 2 pages.

Gieras, "Axial Flux brushless PM machines", Second Edition, Springer, 2008, 1 page.

Yang, et al., "Optimal Design and Control of a Torque Motor for Machine Tools," J. Electromagnetic Analysis & Applications, 2009, pp. 220-228.

JP Notification of Reason for Rejection for Application No. 2019-523150 dated Mar. 2, 2020, pp. 8.

Valavi et al., "Effects of Loading and Slot Harmonic on Radial Magnetic Forces in Low-Speed Permanent Magnet Machine With Concentrated Windings", IEEE Transactions on Magnetics, vol. 51, No. 6, Jun. 2015, 10 pages.

Wrobel et al., "Design Considerations of a Direct Drive Brushless Machine With Concentrated Windings", IEEE Transactions on Energy Conversion, vol. 23, No. 1, 2008, 8 pages.

Wu et al., "A Low-Speed, High-Torque, Direct-Drive Permanent Magnet Generator for Wind Turbines", Conference Record of the IEEE Industry Applications Conference, 2000, 8 pages.

Yahaya, "Single Layer Winding of Three Phase Induction Motor", The International Journal of Engineering and Sciences, vol. 2, No. 4, 2013, pp. 8-13.

Yang et al., "FEA Estimation and Experimental Validation of Solid Rotor and Magnet Eddy Current Loss in Single-sided Axial Flux Permanent Magnet Machines", IEEE Energy Conversion and Exposition (ECCE), 2013, 9 pages.

International Preliminary Report on Patentability received for PCT Application No. PCT/CA2017/050858, dated Jan. 24, 2019, 7 pages.

The Timken® Company, "Angular Contact", Retrieved from the Internet URL: <https ://www .timken.com/products/timken -engineered -bearings/ball/angular-contact/>, Jan. 9, 2017, 4 pages.

Green Car Congress, "Delta Wing partners with DHX Electric Machines; ultra high-torque motors for automotive applications," Retrieved from the Internet URL:< http://www.greencarcongress.com/2016/0l/20160126-dhx.html>, Feb. 7, 2016, 4 pages.

Grundfos, "Motor Book", Grundfos Management A/S, 2004, 252 pages.

Hendershot, "Recent Advances in Electric Machine Design and Operation", IEEE Miami Section in conjunction with Energy Systems Research Laboratory, 2013, 41 pages.

Henneberger et al., "Development of a New Transverse Flux Motor", The Institution of Electrical Engineers, 1997, 6 pages.

Hochberg et al., "Evaporative Cooling of Actuators for Humanoid Robots", Proceedings of 8th Workshop on Humanoid Soccer Robots, 13th IEEE-RAS International Conference on Humanoid Robots (Humanoids), 2013, 6 pages.

Hoganas, "Compact, Light and Cost-Efficient Solutions", Somaloy® Technology, 2013, 3 pages.

Infolytica Corporation, "Axial Flux Motor," Retrieved from the Internet URL: <http://www.infolytica.com/en/applications/ex0072/>, 2016, 2 pages.

Infolytica Corporation, "Iron loss separation in high-torque BLDC Motors", Retrieved from the Internet URL: <http://www.infolytica.com/en/applications/ex0156/>, 2015, 2 pages.

Instructables, "Make Your Own Miniature Electric Hub Motor," Retrieved from the Internet URL:<http://www.instructables.com/id/Make-Your-Own-Miniature-Electric-Hub-Motor/> Sep. 14, 2015, 6 pages.

International Search report and Written Opinion received for PCT Application No. PCT/CA2016/050947, dated Jan. 12, 2017, 13 pages.

Tanaka et al., "Study on a High Torque Density Motor for an Electric Traction Vehicle," Retrieved from the Internet URL: <http:!/papers.sae.org/2009-01-1337/>, 2016, 1 page.

Jack, "Advances in Electric Machines: Topology, Materials and Construction," University of Newcastle upon Tyne, Newcastle Drives and Machines Group, 2011, 52 pages.

Joby Motors, "Introducing the JM IS motor", Retrieved from the Internet URL: <http://www.jobymotors.com/public/views/pages/products.php>, 2011, 2 pages.

Jung et al., "Unique Axial Flux Motor Design Delivers Superior Torque Density", EET European Ele-Drive Conference International Advanced Mobility Forum, 2008, 6 pages.

Jungreuthmayer et al., "A Detailed Heat and Fluid Flow Analysis of an Internal Permanent Magnet Synchronous Machine by Means of Computational Fluid Dynamics", IEEE Transactions on Industrial Electronics, vol. 59, No. 12, 2012, pp. 4568-4578.

Kasinathan et al., "Force Density Limits in Low-Speed Permanent-Magnet Machines Due to Saturation," IEEE Transactions on Energy Conversion vol. 20, No. 1, 2005, pp. 37-44.

Kastinger, "Design of a novel transverse flux machine", Proceedings of the International Conference on Electrical Machines (ICEM), 2002, 6 pages.

Lee et al., "Design of an Axial Flux Permanent Magnet Generator for a Portable Hand Crank Generating System," IEEE Transactions on Magnetics vol. 48, No. 11, 2012, pp. 2977-2980.

Libert, "Design, Optimization and Comparison of Permanent Magnet Motors for a Low-Speed Direct-Driven Mixer", Royal Institute of Technology Department of Electrical Engineering Electrical Machines and Power Electronics, 2004, 142 pages.

LIPO, Principles of Design, Choice of Electric Loading, Introduction to AC Machine Design, 2004, pp. 328-329.

LIPO, "Principles of Design, Practical Considerations Concerning Stator Construction", Introduction to AC Machine Design, Wisconsin Power Electronics Research Center, 2004, pp. 330-331.

LIPO, "Principles of Design, Practical Considerations Concerning Stator Construction", 6.11.4 Selection of Stator Slot Number, 2004, pp. 334-335.

Mahmoudi et al., "A Comparison between the TORUS and AFIR Axial-Flux Permanent-Magnet Machine Using Finite Element Analysis," IEEE International Electric Machines & Drives Conference (IEMDC), 2011, pp. 242-247.

Marignetti et al., "Design of Axial Flux PM Synchronous Machines Through 3-D Coupled Electromagnetic Thermal and Fluid-Dynamical Finite-Element Analysis", IEEE Transactions on Industrial Electronics, vol. 55, Issue 10, 2008, pp. 3591-3601.

Maxon Academy, "Maxon DC motor Permanent magnet DC motor with careless winding", Maxon Motor AG, 2012, 34 pages.

Maxon Academy, "Maxon EC motor, An introduction to brushless DC motors", Maxon Motor AG, 2012, 25 pages.

Maxon Academy, "Maxon Motor Data and Operating Ranges, How to interpret the data of Maxon Motors?", Maxon Motor AG, 2010, 29 pages.

Maxon Motor, "EC-i 40 040 mm, brushless, 70 Watt High Torque", Apr. 2015 edition,1 page.

Maxon Motor, "High speed DC motor—Tips and tricks", Sep. 3, 2015, 1 page.

Maxon Motor, "Trend toward multipole brushless DC motors increases", Media Release, Jun. 12, 2015, 2 pages.

Meier, "Theoretical design of surface-mounted permanent magnet motors with field weakening capability", Master thesis, submitted to the Royal Institute of Technology Department of Electrical Engineering Electrical Machines and Sower Electronics, 2001, 79 pages.

(56) References Cited

OTHER PUBLICATIONS

MOOG Components Group, "Miniature, High-Torque, DC Servo-motors and DC Gearmotors", Series C13 Samarium Cobalt, Retrieved from the Internet URL: <www.moog.com/components>, 2017, pp. 188-192.

Morris, "Elon Musk: Cooling, not power-to-weight ratio, is the challenge with AC induction motors", Retrieved from the Internet URL: <https://chargedevs.com/newswire/elon-musk-cooling-not-power-toweight-ratio-is-the-challenge-with-ac-induction-motors/>, on Nov. 4, 2014, 9 pages.

Myser, "A New Type of Motor Made from Gadget Guts", Retrieved from the Internet URL:< http://www.popsci.com/gadgets/article/2013-06/gardening-circuit>, Jun. 27, 2013, 3 pages.

Oleksandr, "Study on Permanent Magnet Transverse Flux Machine", Dissertation submitted to the Graduate Faculty of the Louisiana State University and Agricultural and Mechanical College, 2012, 149 pages.

Orlik, "Transverse Flux Generators—Principle and Operation Behaviour," 70 Conference at HUSUM Wind Energy, 2008, 20 pages.

Parviainen, "Design of Axial-Flux Permanent-Magnet Low-Speed Machines and Performance Comparison Between Radial-Flux and Axial-Flux Machines," Doctoral thesis, 2005, 155 pages.

Paulides et al., "Eddy-Current Losses in Laminated and Solid Steel Stator Back Iron in a Small Rotary Brushless Permanent-Magnet Actuator", IEEE Transactions on Magnetics, vol. 44, No. 11, 2008, pp. 4373-4376.

Pippuri et al., "Torque Density of Radial, Axial and Transverse Flux Permanent Magnet Machine Topologies", IEEE Transactions on Magnetics, vol. 49, No. 5, 2013, pp. 2339-2342.

Printed Motor Works, "Brushed Pancake Motors", Retrieved from the Internet URL:< http://www.printedmotorworks.com/brushed-pancake-motors/> , Feb. 2, 2016, 13 pages.

Printed Motor Works, "GN Series", 3 pages.

Qu et al., "Performance Comparison of Dual-Rotor Radial-Flux and Axial-Flux Permanent-Magnet BLDC Machines", IEEE International Electric Machines and Drives Conference (IEMDC '03), 2003, 7 pages.

Ricky, "Bright Hub Engineering, What Is Cogging in Electrical Motors?", Retrieved from the Internet URL:< http://www.brighthubengineering.com/commercial-electrical-applications/67622-what-is-coggingin-electrical-motors/>, Feb. 27, 2016, 5 pages.

Seo et al., "A Study on Brushless DC Motor for High Torque Density", World Academy of Science, Engineering and Technology International Journal of Mechanical, Aerospace, Industrial, Mechatronic and Manufacturing Engineering, vol. 5, No. 10, 2011, pp. 2084-2088.

Staton et al., "Solving the More Difficult Aspects of Electric Motor Thermal Analysis", IEEE International Electric Machines and Drives Conference, (IEMDC'03), 2003, 9 pages.

YASA Motors, "YASA-750 Axial Flux Electric Motor", YASA Motors Limited, 2015, 2 pages.

International Preliminary Report on Patentability received for PCT Application No. PCT/CA2017/050857, dated Jan. 24, 2019, 11 pages.

Yang, "FEA Estimation and Experimental Validation of Solid Rotor and Magnet Eddy Current Loss in Single-Sided Axial Flux Permanent Magnet Machines", Doctoral dissertation, presented to the Graduate College at the University of Nebraska, 2013, 98 pages.

Yang, "FEA Estimation and Experimental Validation of Solid Rotor and Magnet Eddy Current Loss in Single-Sided Axial Machines", Doctoral dissertation, presented to the Graduate College at the University of Nebraska, 2013, excerpt from pp. 49-50, 1 page.

\* cited by examiner

ROTARY ACTUATOR

TECHNICAL FIELD

Actuators.

BACKGROUND

A high pole count motor has many advantages such as the potential for high torque and light weight. It has been shown in WIPO published patent application WO2017024409A1 that a solid stator can provide adequate performance in regard to minimizing eddy currents when speeds are relatively low such as when used in robotics. For higher speed applications the use of laminates is preferable to reduce eddy current losses. The challenge is that a high pole count axial motor has a very thin profile (if it is to take advantage of the torque to weight potential) and is therefore very difficult to build out of laminates. For example, if a single rotor and single stator construction is used, the forces pulling the stator and rotor together across the airgap would be expected to shear the glue-lines holding the laminated structure together such that the airgap would not be maintained.

SUMMARY

A rotary actuator solves this problem in a number of ways that include using a double rotor configuration where the stator is positioned between the two rotors. An advantage of this configuration is that the magnetic forces on the stator are reasonably equal in both axial directions on each of the posts at all times. This reduces the load on each of the posts and reduces the stress on each of the glue lines in the stator assembly. The tangential forces on each of the posts can also be very high when under full power, but these forces are also balanced on each posts such that the glue lines are not highly stressed at any time.

Therefore, in an embodiment, there is disclosed an electric machine comprising a stator disposed between rotors, the rotors being mounted on bearings for rotation relative to the stator about an axis of the electric machine, the rotors being separated from the stator by respective air gaps; the stator being formed of structural members, each structural member being formed of laminates, each laminate having a smallest dimension that extends axially; each structural member having slots, and magnetic posts fixed within the slots for support of the magnetic posts by the structural member; and one or more electrical conductors disposed about the posts for generating a series of commutated electromagnetic poles.

BRIEF DESCRIPTION OF FIGURES

Embodiments of a rotary actuator will now be described by way of example, with reference to the figures, in which like reference characters denote like elements, and in which.

DETAILED DESCRIPTION

Figure 1:
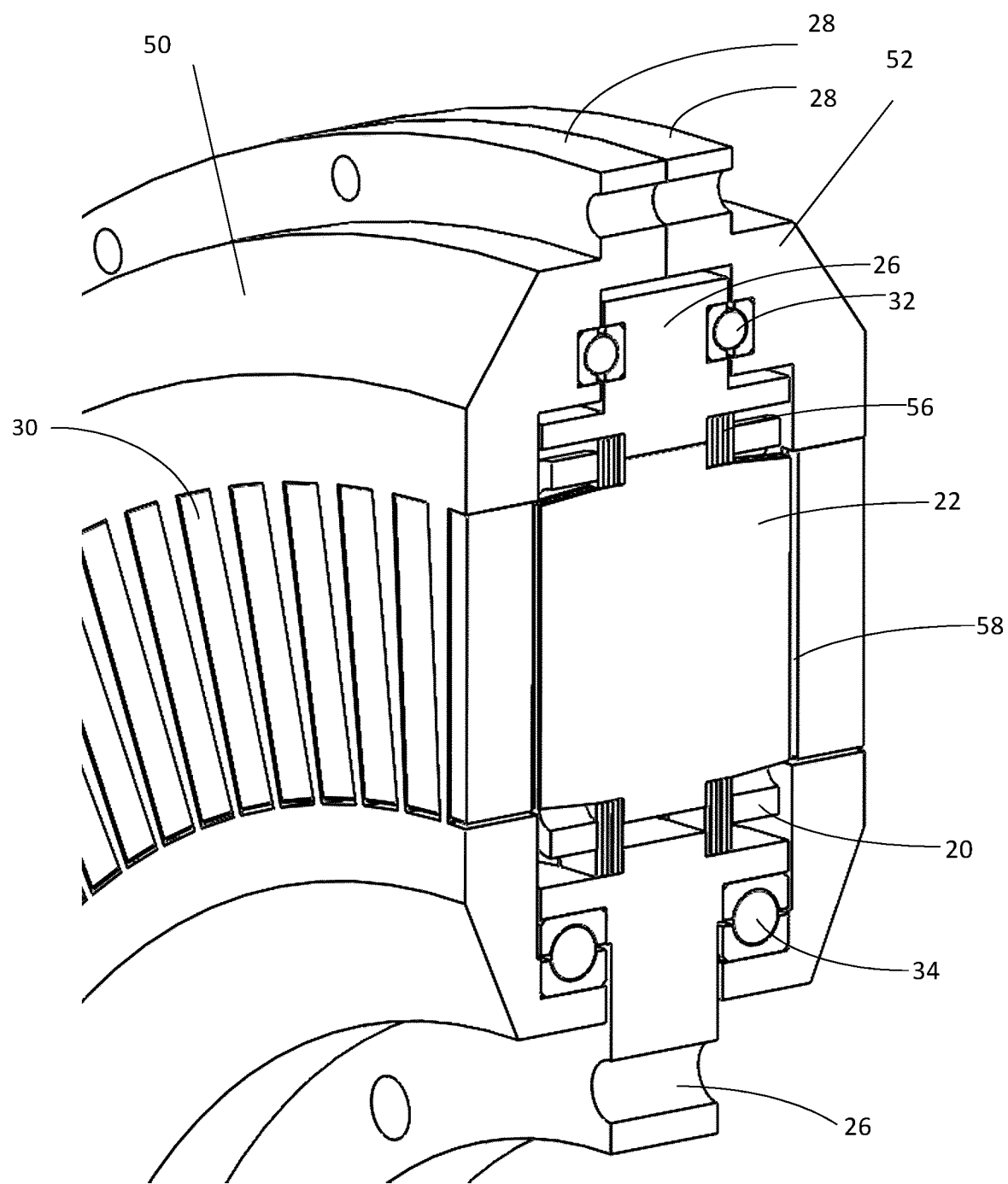
FIG. 1. is a section view of an embodiment of a high speed actuator showing the rotor with magnets, thrust bearings, four-point contact bearings, a stator with laminated posts, laminated structural member of the stator, the solid structural member and the conductors.

A rotary actuator is disclosed that uses a double rotor configuration where the stator is positioned between the two rotors. An advantage of this configuration is that the magnetic forces on the stator are reasonably equal in both axial directions on each of the posts at all times. This reduces the load on each of the posts and reduces the stress on each of the glue lines in the stator assembly. The tangential forces on each of the posts can also be very high when under full power, but these forces are also balanced on each posts such that the glue lines are not highly stressed at any time.

It is desirable to use a "backiron" in this configuration (which does not actually become part of the flux path as with a conventional single stator) with high structural strength and rigidity, as well as high thermal conductivity. Aluminum would be an excellent choice in terms of high strength to weight and high thermal conductivity, but aluminum also has high electrical conductivity so it would generate high eddy currents especially at high operating speeds.

To take advantage of the structural and thermal benefits of aluminum for the backiron, a rotary actuator is disclosed that uses a stack of two or more aluminum disks with slots in the disks to receive the posts, and additional slots, such as radially outward or inward from the slots, to eliminate an electrically conductive path around each of the posts. A single piece of aluminum may be used with radial slots to prevent eddy currents, but it is believed by the inventors that a laminated aluminum structure with eddy current slots that alternate from layer to layer from radially inward to radially outward, provide a stronger and stiffer structure for a given thickness. This is because the eddy current slots on one layer align with a non-slotted ring of material on the next aluminum layer such that the no two adjacent layers have aligned eddy current slots.

The aluminum in the backiron laminates may be coated but they are preferably anodized such as with a hard anodized finish. Anodizing is essentially a ceramic coating which provides high dielectric strength and reasonably good thermal conductivity.

An electric motor/actuator may comprise of a stator which utilizes ferromagnetic material laminates for the electromagnetic posts to reduce the Eddy Current losses. And a high thermal conducting material is preferred to be used in the stator structure to get heat out of the device. The rotor may be made of a ferrous material that performs as required.

| ID Ref. # | Description |
|---|---|
| 20 | Stator Coil |
| 22 | Stator Post Laminate |
| 24 | Stator Non-Ferrous Structural Laminate |
| 26 | Stator back Bone |
| 28 | Outer Rotor Housing |
| 30 | Rotor Magnet |
| 32 | Thrust Bearing |
| 34 | Ball Bearing |
| 36 | Stator Post Laminated Assembly |
| 38 | "M" Non-Ferrous Stator Structural Laminate |
| 40 | "W" Non-Ferrous Stator Structural Laminate |
| 42 | Discontinuous Eddy Current Loop Path |
| 44 | Internal Stator Cooling Chamber |
| 46 | Radial Cut |
| 48 | Stator Post and structural laminate |
| 50 | Rotor Side 1 |
| 52 | Rotor Side 2 |
| 54 | Rotor pole |
| 56 | Structural laminate Assembly |
| 58 | Air gap |
| 60 | Slots |
| 62 | Ridges on the stator backbone |
| 64 | Channel around inside of stator structural members |
| 66 | Chambers between the structural members and between the posts |

Figure 2:
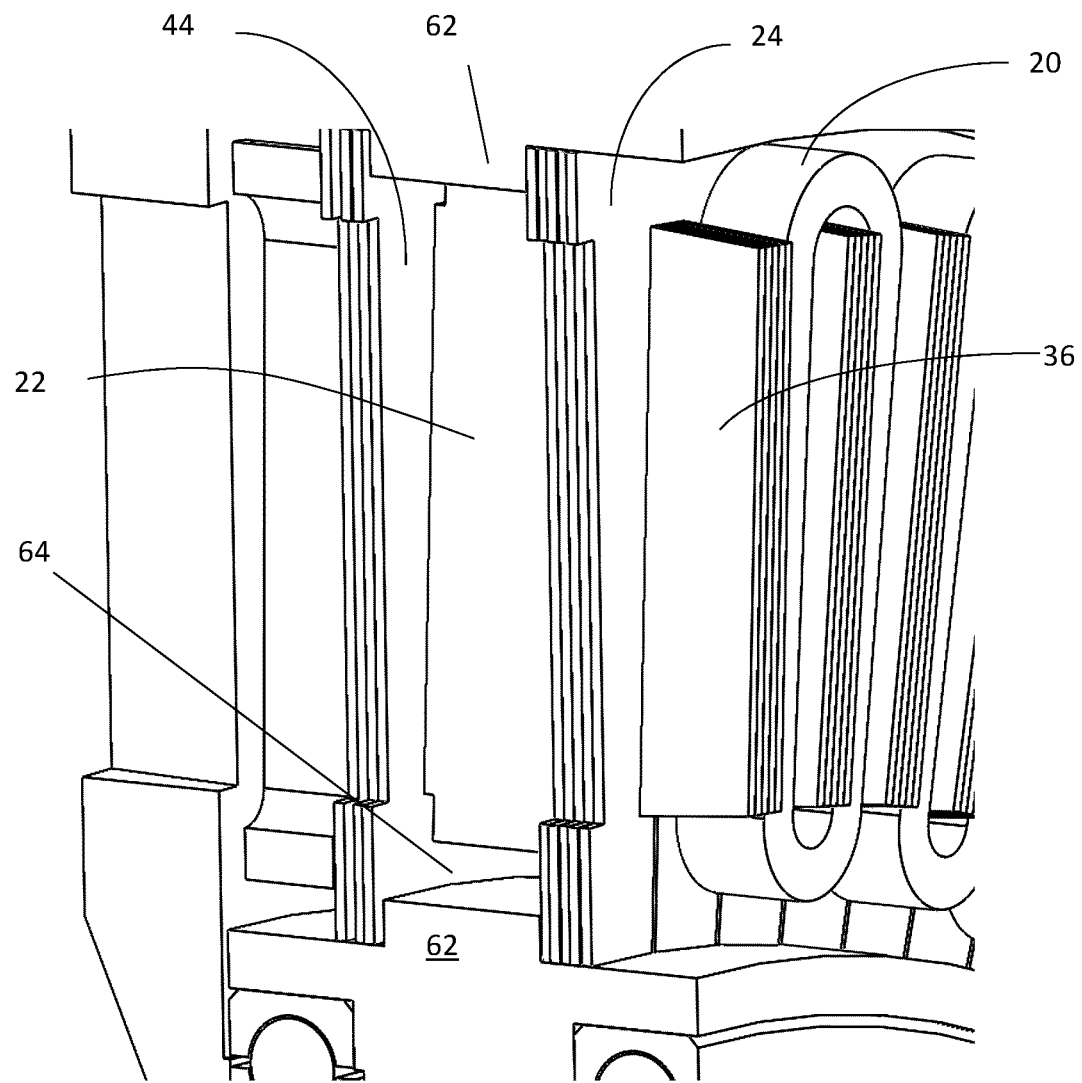
FIG. 2. is a view of an exemplary embodiment having laminated posts installed between the laminated structural member.
Figure 4:
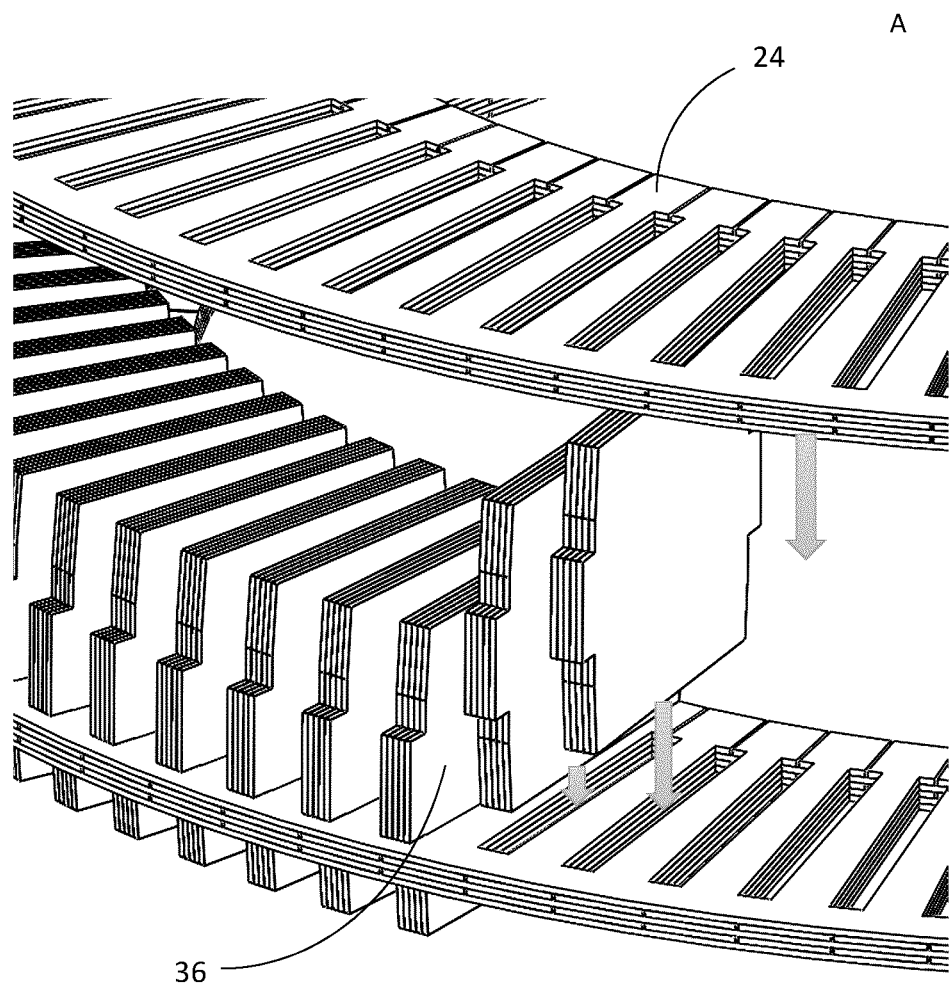
FIG. 4 is a view showing the installation of the laminated stator posts into the laminated structural member of the stator with no solid structural member present.

As shown in FIG. 1, an electric machine comprises a stator, with a backbone 26 and structural laminate assembly 56 disposed between rotors 50 and 52, the rotors 50, 52 being mounted on bearings 32, 34 for rotation relative to the stator about an axis of the electric machine. Approximate location of the axis is identified as A in FIG. 4. The rotors 50, 52 are separated from the stator by respective air gaps 58. As shown in FIG. 2, the stator structural laminate assembly 56 may comprise structural members 24, each structural member being formed as shown in FIG. 2 of annular laminates 38, 40 each laminate 38, 40 having a smallest dimension that extends axially. Each structural member 24 and the corresponding laminates have openings or slots 60, and (as shown in FIG. 4) magnetic posts 36 fixed within the slots 60 for support of the magnetic posts by the structural member 24. The slots 60 may have a longest dimension that extends radially, an intermediate dimension that extends circumferentially and a depth that extends axially. As shown in FIG. 2, one or more electrical conductors 20 are disposed about the posts 36 for generating a series of commutated electromagnetic poles. There may be M poles and N posts and the greatest common factor of N and M is three or more.

Figure 5:
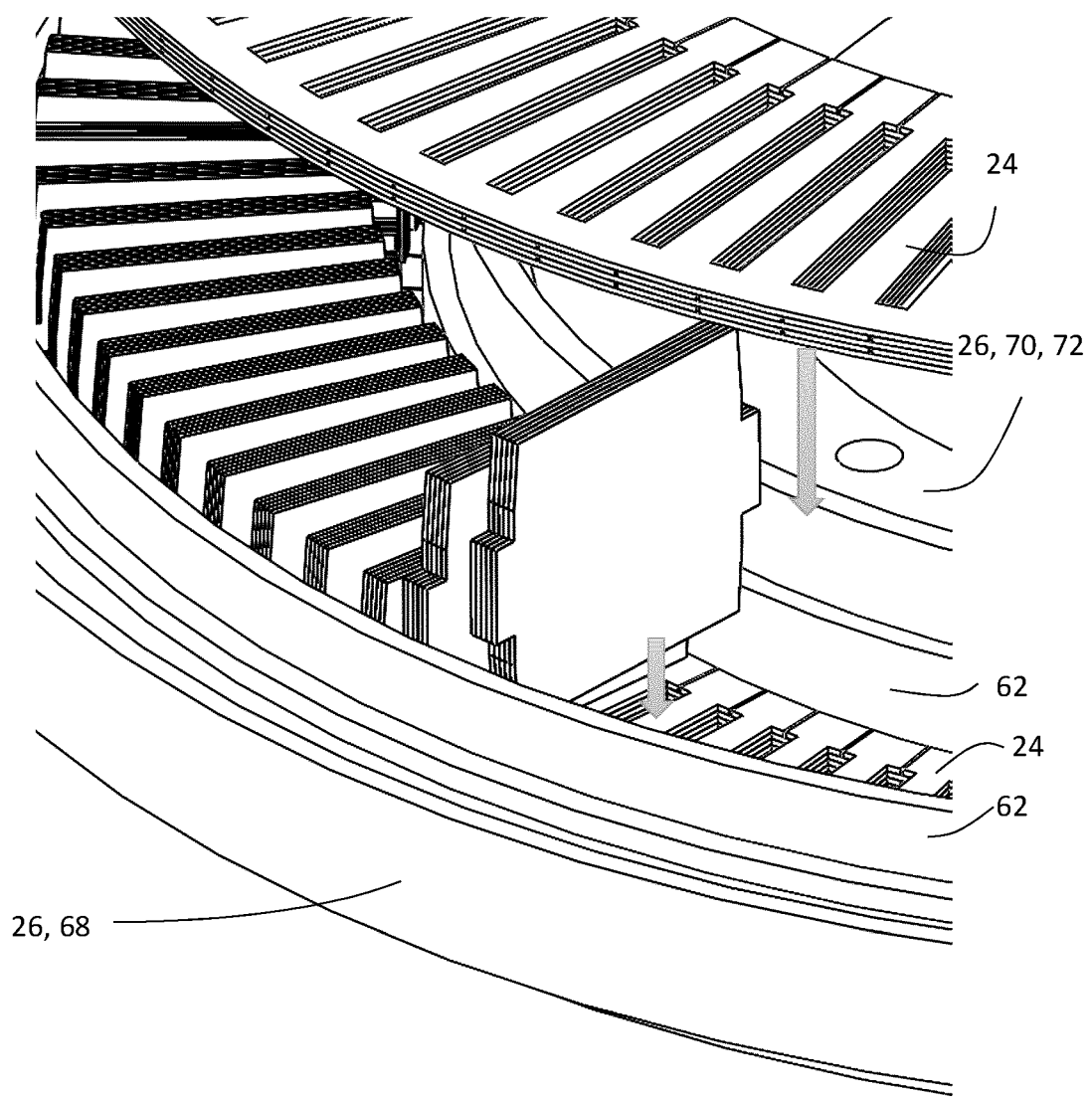
FIG. 5 is a view showing the installation of the laminated stator posts into the laminated structural member of the stator with a solid structural member present which has mounting features.

As shown in FIG. 5, the backbone 26 comprises an outer backbone 68 and inner backbone 70, with the structural members 24 being secured on either side of ridges 62 that extend respectively inward of the outer backbone and outward of the inner backbone. The structural members 24 may be secured to the ridges 62 by any suitable means such as glue.

The rotors 50, 52 are mirror images of each other and are secured to each other for example with bolts or screws (not shown) at their outside peripheries. As shown in FIG. 1 the rotors 50, 52 are mounted for rotation relative to the stator on radial bearings 34 at the inside of the stator and on thrust or axial bearings 32 at the outside of the stator. Bearing races are formed on the backbone 26 of the stator and in the rotors 50, 52. The stator backbone 26 may be secured to a fixed structure at the inner periphery of the backbone 26 by any suitable means. The outward periphery 28 of the rotors 50, 52 may then be used as the output. Power for the windings 20 may be supplied through the inner part of the backbone 26 through channels (not shown). As shown in FIG. 2 the radial length of the stator posts 22 between the structural members 24 may be less than the distance between the ridges 62 of the stator backbone 26 to form a channel 64 around the stator that may be used for flow of a cooling fluid. Channels (not shown) in the inner part of the stator backbone 26 may be used for flowing a cooling fluid in and out of the channel 64.

An exemplary embodiment may use an Iron alloy for the stator posts laminations and an Aluminium alloy for the structural laminates. The stator of an electric machine is formed of structural laminates 24 that have slots that posts 22 are fixed within. The structural laminates 24 have a thinnest dimension in the axial direction, and in the radial direction are annular.

Figure 3:
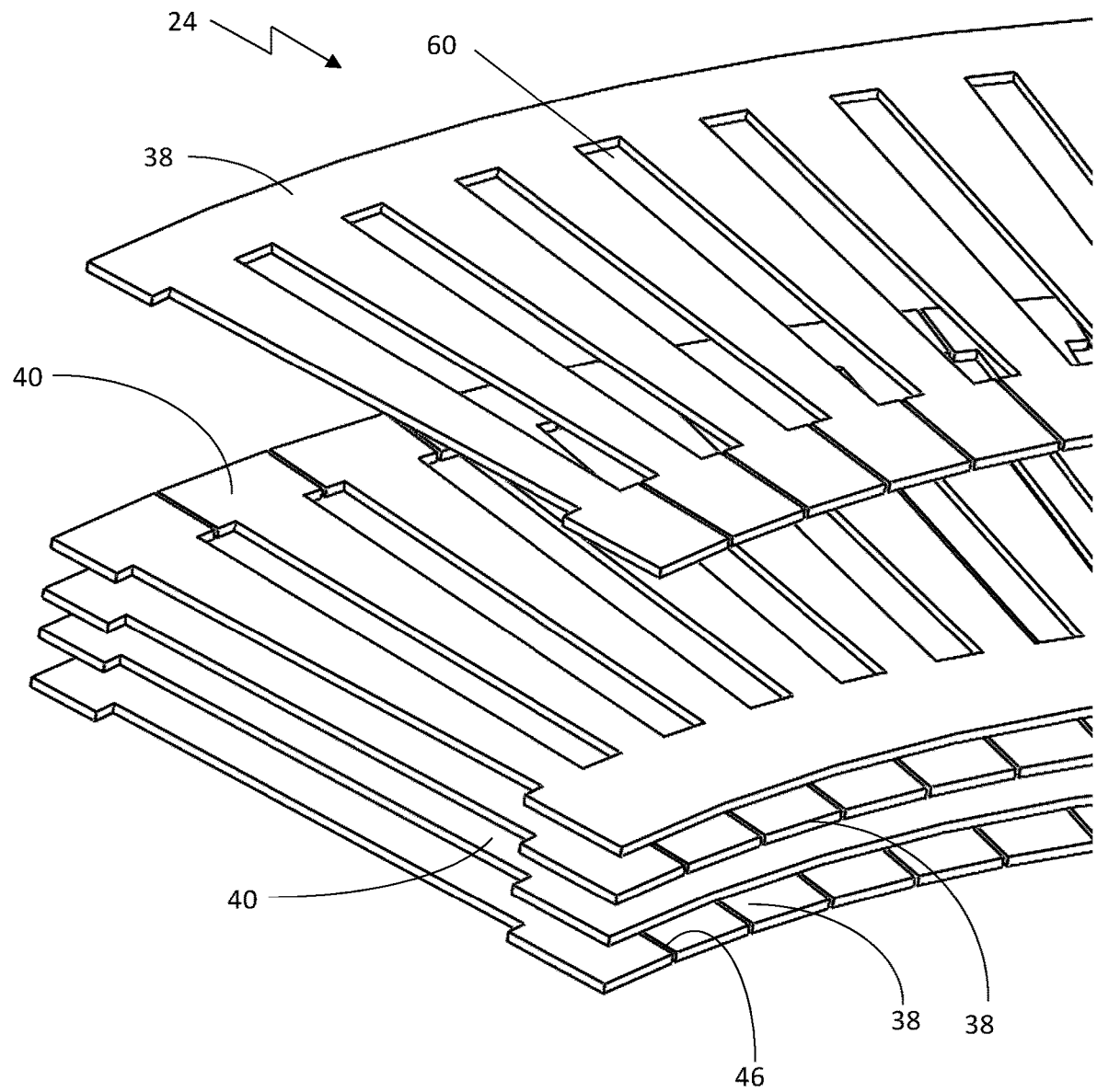
FIG. 3. is a view of the laminated structural member of the stator showing a preferred stack layup of laminations. Where the radial cut is radially inward or outward of the stator post slot, and alternates for each adjacent layer.
Figure 6:
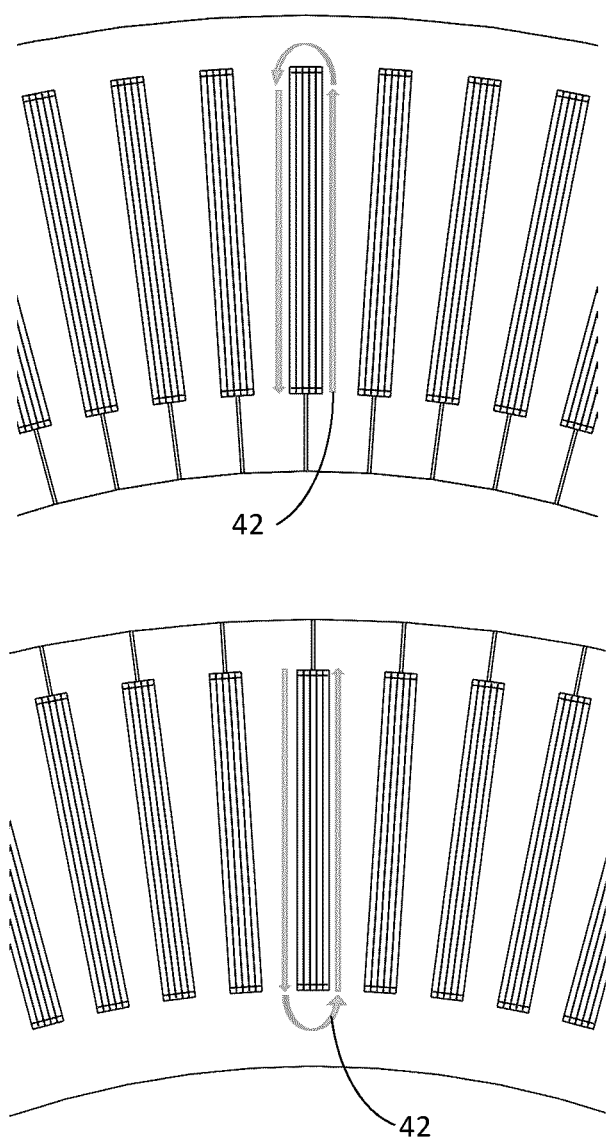
FIG. 6 shows how the Eddy current path is broken by the radial cuts made; both inward and outward of the stator post slot, in the laminates of the laminated structural member.

For the structural laminate 24, as shown in FIG. 3, it is preferred to have radial cuts 46 made from the post slot to the edge of the material to remove the Eddy current loop path 42 around the stator post, as shown in FIG. 6. Slots may also be between the posts such as circumferentially between every second post. The preferred embodiments have opposing radial cuts per layer, as seen in FIG. 3, these may be referred to as the "M" 38 and "W" 40 laminates. This is to remove the Eddy current loop path 42 on all the layers of the structural laminate while still maintaining adequate strength and rigidity in the aluminum layers by virtue of the overlapping sections on one or both sides of each slot on another layer. In an embodiment shown in FIG. 2, it is shown to have but not limited to five layers in each laminated assembly 24, the quantity of the layers is driven by the design scope. This then creates a thicker assembly that has the strength requirement and will reduce the loss from the Eddy Currents by virtue of the interrupted eddy current path on each layer, and the electrical insulation, such as an anodized surface, between each layer.

Figure 8:
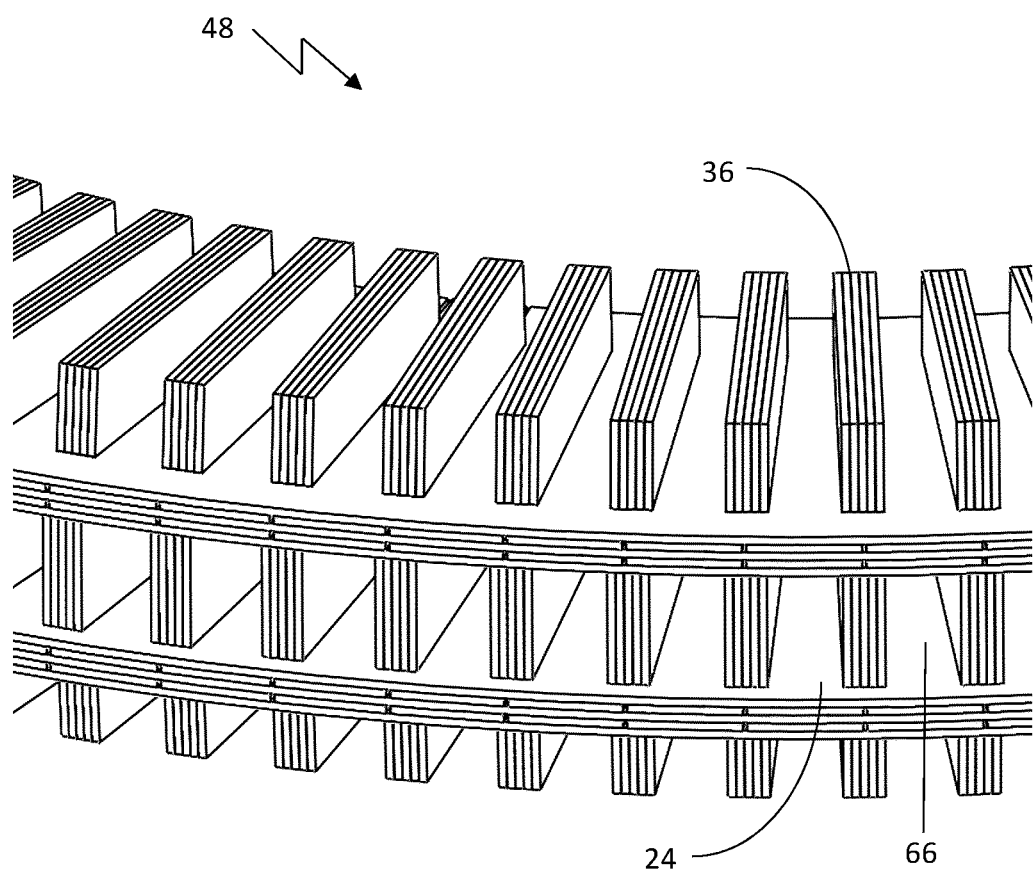
FIG. 8 is a view of the final lamination assembly with 2 laminated structural pieces and laminated stator posts.

The stator post laminates 36, which are preferred to be mounted perpendicular to the structural laminate 24, are then to be mounted between two structural laminates to create the stator, this can be seen in FIG. 4 where an embodiment is mechanically fixed between the structural laminates by a tab at the inner and outer radial position. This assembly may be preferred to have interference and be pressed together to create a solid assembly 48 as seen in FIG. 8. It may be preferred to then coat this sub-assembly in a potting compound to add another material to help the heat get from the stator posts to the structural laminate. The magnetic posts may have an enlarged central section that defines respective shoulders that form the tabs and the respective shoulders engage the structural members to resist axial movement of the magnetic posts within the structural members. The posts and structural members together define chambers 66.

Figure 7:
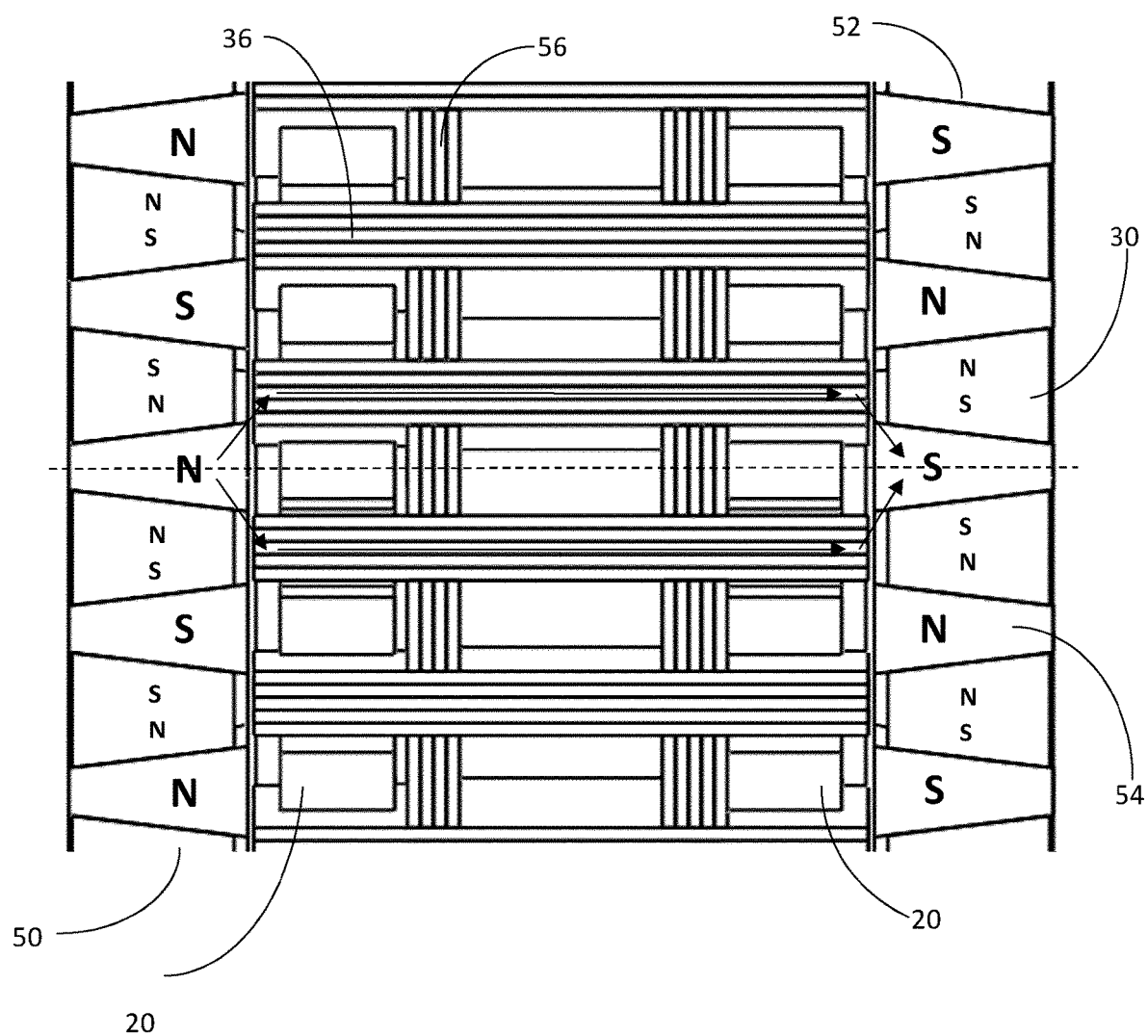
FIG. 7 is a section view of the stator and rotor to show the orientation of the magnets in the rotor and the flux path across the laminated stator posts.

In this preferred configuration a post lamination 36 is used for two stator posts, and acts as a single magnetic dipole. This requires the rotor to have the magnets 30 on side 52 to form poles 54 rotated by one pitch relative to side 50. So that a North Pole is across from a South Pole on the other side of the rotor, seen in FIG. 7 so that axially opposed magnets have opposite polarity.

Figure 9:
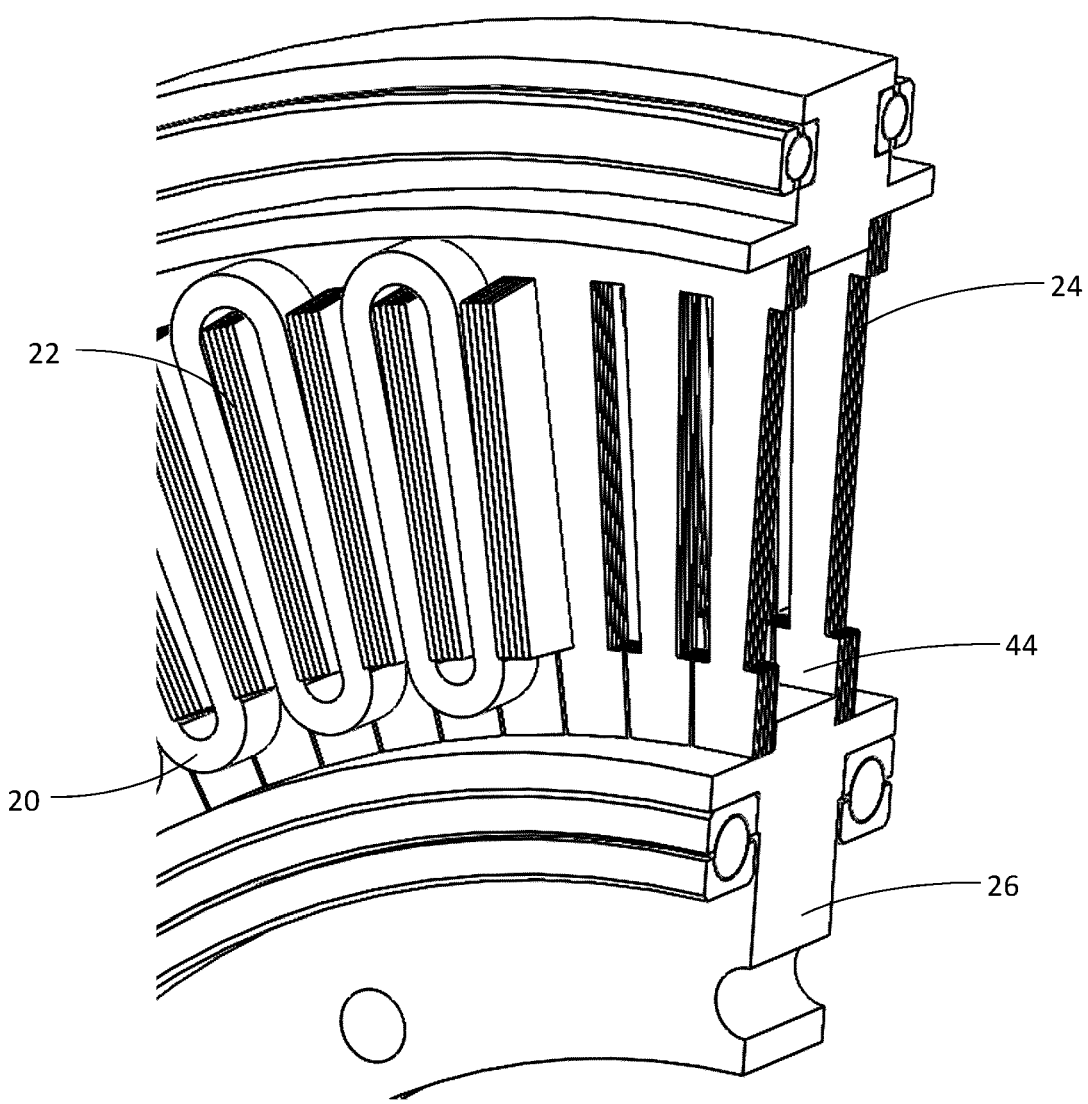
FIG. 9 is a cutaway view of the stator with some posts and coils removed.

The chambers 66 and channel 64 together create a chamber 44 between the two structural laminates as seen in FIG. 2 and FIG. 9, which may extend throughout the space between the stator backbone and rotors that is not occupied by the structural members 24 or the posts. This chamber may be filled with a fluid or gas to remove heat from the stator and stator coils. This is preferred as the fluid or gas will be in direct contact with the center of stator post and structural laminated member which will allow effective heat transfer. This may be preferable as this allows the device to run at higher currents while maintaining a stable, desired temperature. The fluid or gas in this chamber is preferred to flow through the chamber due to a pressure differential between an inlet and an outlet (not shown, but may be in the inner backbone). The fluid or gas may also remain static, or if air cooling is preferred, ambient air may also flow through by natural convection.

To manufacture the device, it may be necessary or helpful to insert a spacer between the two laminated structural members when the posts and aluminum disks are assembled. Then after the coils are added and the stator is potted, the spacer prevents the potting compound from filling the space between the laminated aluminum disks. This spacer is preferably made of a dissolvable material or a meltable material such as wax, which can be removed by dissolving or melting after potting is complete.

To attach the laminated stator assembly to another entity it may be required to insert a solid member in-between the laminates during the assembly process. This is shown in FIG. 5 where an exemplary member is inserted between the structural laminations. This exemplary member allows bearing on the ID and OD to be used and a bolt hole pattern on the ID flange 72 of stator backbone 26.

A single set of coils could be used between the two structural members with shorter posts, instead of the coils 20 shown, that only just protrude from the structural members. This would not have the cooling benefits but would be a lower profile assembly.

With a rotor on each side of the stator, there are balanced axial forces on the stator poles that results from the rotor poles acting with equal force on both axial ends of each post. This tends to eliminate the shear force on the stator post laminates, which reduces the strain on the glue layers between the laminates. The mechanical securing of the stator post laminates between the two aluminum layered disks (with the wider section of the posts between the aluminum layered disks) resists movement of the laminates even if the glue fails. The design reduces eddy currents in the laminates of the structural members as a result of the alternating ID-OD slots in each layer. Alternating from ID to OD with each successive layer provides a non-interrupted surface on at least one side of each eddy current prevention slot on an adjacent layer.

The use of aluminum for the structural members results in a lighter weight structure with excellent heat dissipation characteristics. Anodizing these layers before assembly provides electrical insulation with minimal thermal insulation between layers. The space between the aluminum layered disks can also be used for internal fluid cooling.

The invention claimed is:

1. An electric machine comprising
a stator disposed between rotors, the rotors being mounted on bearings for rotation relative to the stator about an axis of the electric machine, the rotors being separated from the stator by respective air gaps;
the stator comprising structural members, each structural member being formed of laminates, each laminate having a smallest dimension that extends axially;
each structural member having slots, and magnetic posts fixed within the slots for support of the magnetic posts by the structural member; and
one or more electrical conductors disposed about the posts for generating a series of commutated electromagnetic poles,
wherein each laminate includes a radial cut for functioning as a barrier to completion of an electrical current circuit around the posts, wherein the radial cuts in the respective laminates are made from a post slot to an adjacent edge of the laminate, and wherein the radial cuts alternate on adjacent laminates between opposing sides of the slots.

2. The electric machine of claim 1 in which there are M poles and N posts and the greatest common factor of N and M is three or more.

3. The electric machine of claim 1 in which each post includes an eddy current reduction feature comprising electrical insulating laminates or powder.

4. The electric machine of claim 1 in which the posts comprise laminated ferrous material.

5. The electric machine of claim 1 in which the posts comprise electrically insulated powdered material.

6. The electric machine of claim 1 further comprising a stator backbone to which the structural members are mounted.

7. The electric machine of claim 6 in which the structural members are spaced apart by ridges on the stator backbone.

8. The electric machine of claim 7 in which the structural members form chambers between the structural members and the posts, and a channel extends around the inner part of the backbone, the chambers and channel combining to form a cooling chamber within the stator.

9. The electric machine of claim 6 in which the stator backbone comprises an inner part and an outer part.

10. The electric machine of claim 9 in which the bearings comprise radial bearings between the rotors and inner part of the backbone and axial thrust bearings between the rotors and the outer part of the backbone.

11. The electric machine of claim 1 in which the radial cuts comprise blind slots.

12. The electric machine of claim 1 in which the stator posts are laminated.

13. The electric machine of claim 12 in which the stator posts comprise magnetic materials.

14. The electric machine of claim 1 in which the laminated posts extend axially outward on both sides of the structural members and pass through each of the structural members, each post forming a magnetic dipole, and axially opposed magnets of the rotors have opposite polarity.

15. The electric machine of claim 1 in which the structural members comprise non-magnetic material.

16. The electric machine of claim 15 in which the laminates of the structural members comprise anodized aluminum.

17. The electric machine of claim 1 in which the magnetic posts have an enlarged central section defining respective shoulders and the respective shoulders engage the structural members to resist axial movement of the magnetic posts within the structural members.

\* \* \* \* \*